(12) United States Patent
Lasserre et al.

(10) Patent No.: US 11,769,275 B2
(45) Date of Patent: Sep. 26, 2023

(54) METHOD AND DEVICE FOR PREDICTIVE ENCODING/DECODING OF A POINT CLOUD

(71) Applicant: InterDigital VC Holdings, Inc., Wilmington, DE (US)

(72) Inventors: Sebastien Lasserre, Cesson-Sevigne (FR); Saurabh Puri, Cesson-Sevigne (FR); Kangying Cai, Cesson-Sevigne (FR); Julien Ricard, Cesson-Sevigne (FR); Celine Guede, Cesson-Sevigne (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 172 days.

(21) Appl. No.: 16/755,635

(22) PCT Filed: Oct. 11, 2018

(86) PCT No.: PCT/US2018/055392
§ 371 (c)(1),
(2) Date: Apr. 13, 2020

(87) PCT Pub. No.: WO2019/079093
PCT Pub. Date: Apr. 25, 2019

(65) Prior Publication Data
US 2020/0258262 A1    Aug. 13, 2020

(30) Foreign Application Priority Data

Oct. 19, 2017  (EP) ..................................... 17306423
Oct. 19, 2017  (EP) ..................................... 17306424

(51) Int. Cl.
*G06T 9/00*     (2006.01)
*G06F 17/16*    (2006.01)
*G06T 3/00*     (2006.01)

(52) U.S. Cl.
CPC ................ *G06T 9/00* (2013.01); *G06F 17/16* (2013.01); *G06T 3/0006* (2013.01)

(58) Field of Classification Search
CPC .......... G06T 9/00; G06T 3/0006; G06F 17/16
See application file for complete search history.

(56) References Cited

U.S. PATENT DOCUMENTS 5,301,136 A   4/1994  McMILLAN, Jr. et al.
5,954,787 A   9/1999  Eun
(Continued)

FOREIGN PATENT DOCUMENTS

CN    103116897 A    5/2013
CN    105719242 A    6/2016
(Continued)

OTHER PUBLICATIONS

Shao, T., et al., "Inter-Picture Prediction Based on 3D Point Cloud Model", 2015 IEEE International Conference on Image Processing (ICIP), pp. 3412-3416, Sep. 2015.*
(Continued)

*Primary Examiner* — Xuemei G Chen
(74) *Attorney, Agent, or Firm* — Condo Roccia Koptiw LLP

(57) ABSTRACT

This method for inter-predictive encoding of a time-varying 3D point cloud including a series of successive frames divided in 3D blocks into at least one bitstream comprises encoding (20) 3D motion information including a geometric transformation comprising rotation information representative of a rotation transformation and translation information representative of a translation transformation, wherein the translation information comprises a vector ΔT representing an estimation error of the translation transformation.

18 Claims, 7 Drawing Sheets

(56) References Cited

U.S. PATENT DOCUMENTS

| | | | |
|---|---|---|---|
| 6,204,854 B1 | 3/2001 | Signes et al. | |
| 6,897,883 B1 | 5/2005 | Mata et al. | |
| 7,260,592 B2 | 8/2007 | Sheaffer | |
| 7,945,609 B2 | 5/2011 | Lee et al. | |
| 8,392,492 B2 | 3/2013 | Tsai | |
| 9,024,939 B2 | 5/2015 | Sabiston et al. | |
| 9,124,244 B2 | 9/2015 | Pi et al. | |
| 9,438,891 B2 | 9/2016 | Mannion et al. | |
| 10,225,573 B1 * | 3/2019 | Mukherjee | H04N 19/527 |
| 2011/0164810 A1 * | 7/2011 | Zang | G06T 19/003 |
| | | | 382/154 |
| 2011/0316976 A1 * | 12/2011 | Nakajima | H04N 5/213 |
| | | | 348/46 |
| 2014/0010284 A1 | 1/2014 | Hong et al. | |
| 2015/0078674 A1 | 3/2015 | Jiang et al. | |
| 2015/0092851 A1 * | 4/2015 | Yoshikawa | H04N 19/42 |
| | | | 375/240.13 |
| 2015/0117605 A1 * | 4/2015 | Sugiura | G06T 7/73 |
| | | | 378/62 |
| 2015/0287189 A1 * | 10/2015 | Hirai | A61N 5/107 |
| | | | 600/1 |
| 2015/0371431 A1 * | 12/2015 | Korb | G06V 30/422 |
| | | | 382/113 |
| 2016/0227253 A1 * | 8/2016 | Sato | H04N 19/12 |
| 2017/0214943 A1 * | 7/2017 | Cohen | H04N 19/91 |
| 2017/0347120 A1 * | 11/2017 | Chou | H04N 19/15 |
| 2017/0347122 A1 * | 11/2017 | Chou | G06T 9/00 |
| 2019/0164332 A1 * | 5/2019 | Matsunobu | G06T 7/50 |
| 2021/0168394 A1 * | 6/2021 | Kato | H04N 19/46 |
| 2021/0192796 A1 * | 6/2021 | Aflaki Beni | H04N 13/161 |

FOREIGN PATENT DOCUMENTS

| | | |
|---|---|---|
| CN | 106296596 A | 1/2017 |
| GB | 2139046 B | 6/1986 |
| JP | 3046115 B2 | 5/2000 |
| WO | WO 9718623 A1 | 5/1997 |

OTHER PUBLICATIONS

Shen, Y.-Z., et al., "Aquaternion-based geodetic datum transformation algorithm", J Geod (2006) 80: pp. 233-239, DOI 10.1007/s00190-006-0054-8.*

Kathariya et al., "Dynamic Geometry Compression with Binary Tree Based Prediction and Residual Coding", International Organization on Standardization, ISO/IEC JTC1/SC29/WG11, Coding of Moving Pictures and Audio, ISO/IEC JTC1/SC29/WG11 MPEG2017/m40607, Hobart, Australia, Apr. 2017, 6 pages.

Chou et al., "Dynamic Polygon Clouds: Representation and Compression for VR/AR", Microsoft Research Technical Report MSR-TR-2016-59, arXiv:1610.00402v2 [cs.GR], Mar. 8, 2017, 28 pages.

Mekuria et al., "Design, Implementation, and Evaluation of a Point Cloud Codec for Tele-Immersive Video", IEEE Transactions on Circuits and Systems for Video Technology, vol. 27, No. 4, Apr. 2017, pp. 828-842.

Slomp et al., "Temporal Octrees for Compressing Dynamic Point Cloud Streams", 2014 Second International Conference on 3D Vision, Tokyo, Japan, Dec. 8, 2014, pp. 49-56.

Pauly et al., "Discovering Structural Regularity in 3D Geometry", ACM Transactions on Graphics, vol. 27, No. 3, Aug. 2008, 11 pages.

Mekuria et al., "3DTI Mesh Coding Architecture and Basic implementation", International Organization for Standardization, ISO/IEC JTC1/SC29/WG11, Coding of Moving Pictures and Audio, ISO/IEC JTC1/SC29/WG11 MPEG2014/m35196, Strasbourg, France, Oct. 2014, 6 pages.

Wang et al., "Spectral Animation Compression", Journal of Computer Science and Technology, vol. 30, No. 3, May 2015, pp. 540-552.

Kammerl et al., "Real-time Compression of Point Cloud Streams", 2012 IEEE International Conference on Robotics and Automation (ICRA), Saint Paul, Minnesota, USA, May 14, 2012, pp. 778-785.

Yoon et al., "A Look-up Table Based Adaptive Reversible Multiplication-free Transform", Course EE398—Image and Video Compression, Stanford University, Information Systems Laboratory Electrical Engineering, Mar. 2006, 8 pages.

Peng et al., "Geometry-guided Progressive Lossless 3D Mesh Coding with Octree (OT) Decomposition", ACM Transactions on Graphics, vol. 24, No. 3, Jul. 2005, pp. 609-616.

Thanou et al., "Graph-Based Motion Estimation and Compensation for Dynamic 3D Point Cloud Compression", IEEE International Conference on Image Processing (ICIP), Quebec City, Canada, Sep. 27, 2015, pp. 3235-3239.

De Queiroz et al., "Motion-Compensated Compression of Dynamic Voxelized Point Clouds", IEEE Transactions on Image Processing, vol. 26, No. 8, Aug. 2017, pp. 3886-3895.

Cai et al., "Pattern-Based 3D Model Compression", 2016 IEEE International Conference on Acoustics, Speech and Signal Processing (ICASSP), Shanghai, China, Mar. 20, 2016, pp. 2872-2876.

* cited by examiner

METHOD AND DEVICE FOR PREDICTIVE ENCODING/DECODING OF A POINT CLOUD

This application claims the benefit under 35 U.S.C. § 371 of International Application PCT/US2018/055392, filed Oct. 11, 2018, which was published in accordance with PCT Article 21(2) on Apr. 25, 2019, in English, and which claims the benefit of European Patent Application No. 17306424.7 filed on Oct. 19, 2017 and European Patent Application No. 17306423.9 filed on Oct. 19, 2017.

FIELD

The present disclosure generally relates to the field of point cloud data sources that represent 3D objects.

More particularly, it deals with dynamic, i.e. time-varying, 3D point clouds.

Thus, the disclosure concerns methods for encoding and decoding a point cloud and corresponding encoder and decoder. It further concerns computer programs implementing the encoding and decoding methods of the invention.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A point cloud consists in a set of points usually intended to represent the external surface of a 3D object but also more complex geometries like hair, fur that may not be represented efficiently by other data format like meshes. Each point is defined by its 3D spatial location (x, y and z coordinates in the 3D space), i.e, geometry information, and possibly by other associated attributes, which typically include the color information represented in the RGB or YUV or any other color coordinate system. Other attributes may include a transparency, a reflectance, etc.

Point clouds may be static or dynamic depending on whether the point cloud evolves with respect to time. It should be noticed that in case of a dynamic point cloud, the number of points is not constant but, on the contrary, generally evolves with time. A dynamic point cloud is thus a time-ordered list of sets of points.

The present disclosure concerns more particularly dynamic 3D point clouds. Such point clouds are a useful representation for 3D video streams in mixed reality systems, such as augmented reality, in which a natural scene is combined with synthetic or virtual objects, or, vice versa, in immersive virtual rooms in which a synthetic scene is augmented with a live captured natural 3D video stream representing a user.

3D point clouds are very suitable for real-time acquisition and communication at a fast rate. However, realistic reconstructed 3D point clouds may contain hundreds of thousands up to millions of points, and compression is critical to achieve efficient and real-time communication in bandwidth-limited networks.

Compression of 3D point clouds has received significant attention in recent years. To compare different solutions, often the compression rate and the geometric distortion have been evaluated.

However, in the context of immersive, augmented, and mixed reality communication systems, several other additional factors are of importance to evaluate the compression solution.

Indeed, as in these systems, point cloud sequences are captured at a fast rate, inter-frame redundancy can be exploited to achieve a better compression performance via inter prediction, which is usually not considered in existing static point cloud coders.

The article of R. Mekuria et al: "Design, Implementation, and Evaluation of a Point Cloud Codec for Tele-immersive Video", IEEE Transactions on Circuits and Systems for Video Technology, Vol. 27, No. 4, pages 828-842, April 2017, describes a codec for time-varying 3D point clouds for augmented and immersive 3D video. The proposed codec exploits inter-frame redundancies and introduces a method for inter-predictive encoding of frames based on previous inputs, which includes a rigid transform computation based on the Iterative Closest Point (ICP) algorithm. The computed rigid transformation can be used to generate a predictor.

This rigid transformation matrix Transf is a 4×4 matrix including a 3×3 rotation matrix R and a 3×1 translation vector T. It is represented in FIG. 1.

While the solution of this article permits, by using inter prediction, to increase the Rate-Distortion, (RD) performance, of dynamic 3D point cloud codecs, there is still a need to reduce the number of the required bitrates to encode the rigid transformation matrices. For instance, in the article, the translation vector T is quantized using 16 bits per component (i.e. x, y, z), which is still a big quantity.

SUMMARY

The present disclosure proposes a solution for improving the situation.

The present disclosure provides a method and a device for encoding a point cloud according to claims 1 and 2 and a method and a device for decoding a point cloud according to claims 13 and 14.

Accordingly, the present disclosure provides a method for predictive encoding of a time-varying 3D point cloud including a series of successive frames divided in 3D blocks into at least one bitstream, comprising encoding 3D motion information including a geometric transformation comprising rotation information representative of a rotation transformation and translation information representative of a translation transformation, wherein the translation information comprises a vector $\Delta T$ representing an estimation error of the translation transformation.

Thus, the method of the present disclosure enables, by encoding only the estimation error of the translation vector T and not the translation vector T itself, a significant reduction of the range of the translation vector compared to the prior art. Thus, much less quantization bits are required for the inter-predictive encoding of dynamic 3D point clouds than in the prior art.

Advantageously, the rotation transformation is represented by a rotation matrix R and the encoding method comprises:

encoding the rotation matrix R;
decoding the encoded rotation matrix to obtain a reconstructed rotation matrix $R^{rec}$; and
determining an estimate of the translation transformation as a vector $T^*$ function of the reconstructed rotation matrix $R^{rec}$.

Thus, according to the present disclosure, it is the vector $\Delta T = T - T^*$ that is encoded. The range of $\Delta T$ is much less than the range of T, as it is approximately the size of the 3D blocks, which is generally chosen very small. For instance, if the 3D blocks are cubes with a fixed size 16×16×16, then only 4 bits are necessary to encode each component of ΔT.

Advantageously, the 3D motion information includes a vector pointing to a matched reference 3D-block associated with each 3D block of a current point cloud frame, said matched reference 3D-block being in a reference point cloud frame.

The reference point cloud frame is a point cloud frame that has been already encoded.

It is important to note that the geometric transformation including the rotation and translation information transforms the subset of the reference point cloud frame falling into the matched reference 3D-block, to the closest form of the subset of the current point cloud frame falling into the 3D-block currently being encoded.

Advantageously, the estimate T* of the translation information is a function of the reconstructed rotation matrix $R^{rec}$ and of a reconstructed vector pointing to the matched reference 3D-block.

Preferably, the matched reference 3D-block is selected from a plurality of candidate reference 3D-blocks in the reference point cloud frame, as the reference 3D-block providing a minimum prediction error which is smaller than a threshold.

This means that each block to be encoded in the current frame is compared with several blocks within a searching region in the reference frame. This is very advantageous, as there is more chance for the blocks to be encoded to find matched reference blocks and to be compressed by inter prediction.

Advantageously, the geometric transformation is represented by a 4×4 transformation matrix determined using an Iterative Closest Point, ICP, algorithm.

The ICP algorithm has been described in the article from Paul J. Besl et al.: "A method for registration of 3-D shapes", IEEE Transactions on Pattern Analysis and Machine Intelligence, Vol. 14, No. 2, p. 239-256, 1992 and in the article of T. Tamaki et al.: "Softassign and EM-ICP on GPU", 2010 First International Conference on Networking and Computing, Higashi-Hiroshima, 2010, p. 179-183.

According to an embodiment, the rotation transformation is represented by three Euler angles.

Advantageously, the encoding of the rotation information uses at least one trigonometric Look-Up Table, LUT.

By using such LUT, the conversion between trigonometric function values and angles can be avoided. This permits to improve the encoding precision and to reduce its computational complexity.

According to another embodiment, the rotation transformation is represented by a unit quaternion.

These representations are more compression friendly than the 3×3 rotation matrix.

The present disclosure also provides an encoder for predictive encoding of a time-varying 3D point cloud including a series of successive frames divided in 3D blocks into at least one bitstream, the encoder comprising means for encoding 3D motion information including a geometric transformation comprising rotation information representative of a rotation transformation and translation information representative of a translation transformation, wherein the translation information is represented by a vector ΔT representing an estimation error of the translation transformation.

Advantageously, the 3D motion information includes a vector pointing to a matched reference 3D-block associated with each 3D block of a current point cloud frame, said matched reference 3D-block being in a reference point cloud frame.

The present disclosure further provides a method for predictive decoding, from at least one bitstream, of a time-varying 3D point cloud including a series of successive frames divided in 3D blocks, comprising decoding 3D motion information including a geometric transformation comprising rotation information representative of a rotation transformation and translation information representative of a translation transformation, wherein the translation information is represented by a vector ΔT representing an estimation error of the translation transformation.

The present disclosure also provides a decoder for inter-predictive decoding, from at least one bitstream, of a time-varying 3D point cloud including a series of successive frames divided in 3D blocks, the decoder comprising means for decoding 3D motion information including a geometric transformation comprising rotation information representative of a rotation transformation and translation information representative of a translation transformation, wherein the translation information is represented by a vector ΔT representing an estimation error of the translation transformation.

The methods according to the disclosure may be implemented in software on a programmable apparatus. They may be implemented solely in hardware or in software, or in a combination thereof.

Since these methods can be implemented in software, they can be embodied as computer readable code for provision to a programmable apparatus on any suitable carrier medium. A carrier medium may comprise a storage medium such as a floppy disk, a CD-ROM, a hard disk drive, a magnetic tape device or a solid state memory device and the like.

The disclosure thus provides a computer-readable program comprising computer-executable instructions to enable a computer to perform the encoding method of the disclosure.

The diagram of FIG. 3 illustrates an example of the general algorithm for such computer program.

The disclosure also provides a computer-readable program comprising computer-executable instructions to enable a computer to perform the decoding method of the disclosure.

The diagram of FIG. 8 illustrates an example of the general algorithm for such computer program.

BRIEF DESCRIPTION OF THE DRAWINGS

The present invention is illustrated by way of examples, and not by way of limitation, in the figures of the accompanying drawings, in which like reference numerals refer to similar elements and in which.

DETAILED DESCRIPTION OF PREFERRED EMBODIMENTS

The principles of the present disclosure can be used in both inter-prediction coding and intra-prediction coding. The following described embodiments are for the case of inter-prediction coding.

Figure 2:
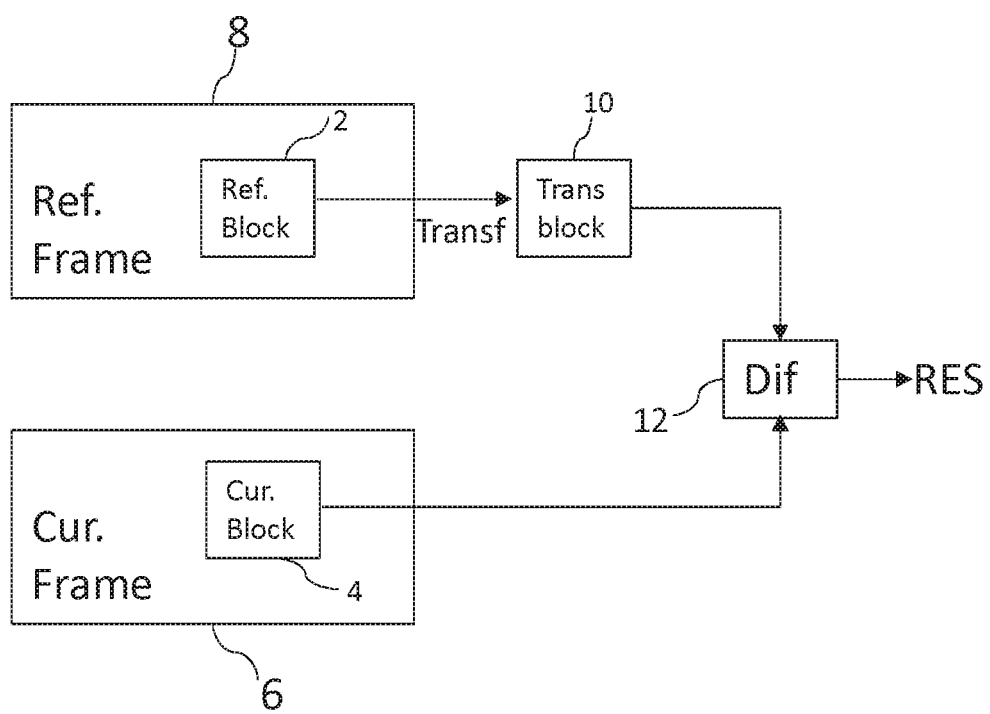
FIG. 2 is a flowchart showing the principle of the inter-predictive encoding of a 3D point cloud.

The principle of inter-predictive encoding of a 3D point cloud according to an embodiment of the present invention is illustrated in the flowchart of FIG. 2.

The 3D point cloud includes a series of successive frames divided into 3D blocks.

Inter-predictive encoding exploits the temporal redundancy between neighboring frames, i.e., instead of directly encoding the raw data of each 3D block, the encoder will try to find a 3D block 2, named reference block, similar to the current block 4 in a current frame 6, that is encoded on a previously encoded frame 8, referred to as a reference frame. This process is based on a block matching algorithm. If the encoder succeeds on its search, the block 4 could be encoded using 3D motion information representing a transformation between the reference block 2 and the current block 4 and a prediction error or residual, i.e. the difference 12 between a transformed block 10 obtained by the transformation of the matched reference block 2 and the current block 4. Both the 3D motion information and the prediction residual are encoded and sent in at least one bitstream to the decoder recover the current block 4 encoded by inter-prediction based coding.

According to an embodiment, the 3D blocks are cubes with fixed size, for example 16×16×16.

The 3D blocks are not necessarily fully occupied. They can contain between 1 and $K^3$ elements, where K is the size of the 3D block, for example, for a 16×16×16 block, K=16.

Figure 3:
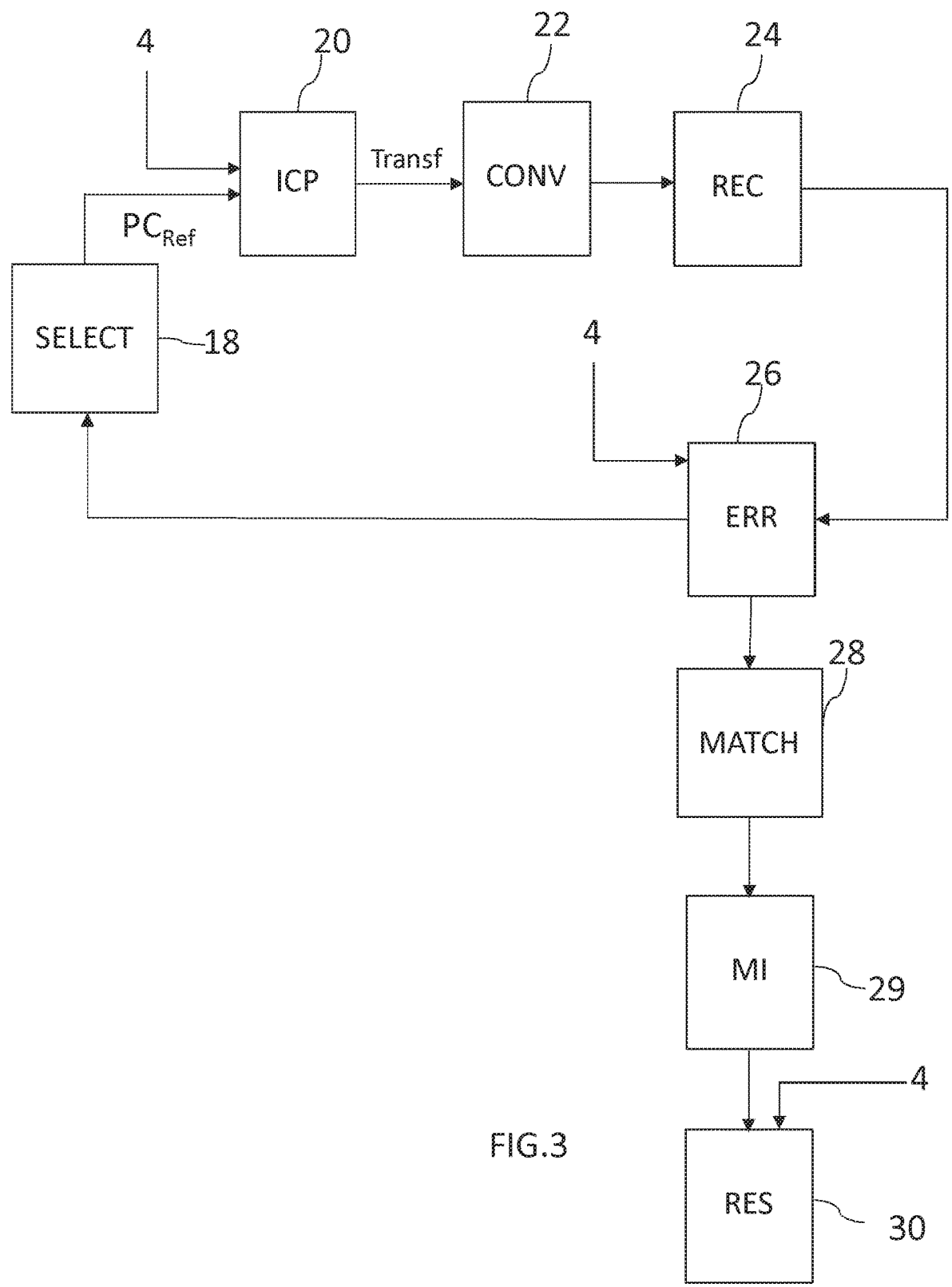
FIG. 3 is a flowchart showing the steps of the method of encoding a point cloud, according to an embodiment of the present invention.

FIG. 3 is a block diagram showing the steps of the inter-predictive encoding of the current block 4 from the current frame 6 according to a preferred embodiment of the present disclosure.

For the current frame 6, the reference frame 8 is chosen from the point cloud frames within a same group of point cloud frames, called GOPC hereafter, for inter frame coding. Therefore, a common bounding-box is used for one GOPC. The bounding-box of the current frame is first uniformly divided into 3D-blocks. Only the 3D-blocks of the current frame containing at least one point will be processed for the inter-predictive encoding.

Let's suppose that the left bottom corner of the current 3D block 4 is $(x_{min}, y_{min}, z_{min})$, then the 3D-blocks of the reference frame 8 with their left bottom corners in the region $([x_{min}-S, x_{min}+S], [y_{min}-S, y_{min}+S], [z_{min}-S, z_{min}+S])$ constitute the searching region of the matched reference 3D-block. The searching step is denoted by $\Delta S$ According to an example, when the size of the current 3D-block is 16×16×16, S is chosen equal to 4 and $\Delta S$ equal to 2.

For each pair of candidate reference block $PC_{Rec}$ selected, at step 18, from the searching region and current block $PC_{Cur}$ 4, the alignment of the two subsets of point cloud frames 6, 8 is achieved at step 20 by the Iterative Closest Point (ICP) algorithm. By subsets, it is meant here the points of the reference frame 8 falling into the candidate reference block $PC_{Ref}$ and the points of the current frame 6 falling into the current block $PC_{Cur}$.

The ICP outputs a rotation matrix R and a translation vector T which minimize the mean square errors between the two subsets of point cloud frames 6, 8. Thus, the result of the point cloud frame subset alignment is a 4×4 transformation matrix $Transf^{ICP}$ having the form represented in FIG. 1.

The "iterative" feature of ICP comes from the fact that the point correspondences are reconsidered as the solution comes closer to the error local minimum. As any gradient descent method, ICP is applicable when there is a relatively good starting point in advance Otherwise, it will be trapped into the first local minimum and the solution will be useless. Therefore, there is a need to approximately align the candidate reference block and the current block beforehand. This initial alignment is achieved by translating the candidate reference block to make the mean of this candidate reference block and the current block overlapped. An initial transformation matrix, denoted as $Transf^{Init}$, can then be determined by $$Transf^{Init} = \begin{bmatrix} 1 & 0 & 0 & (M_x^{Cur} - M_x^{Ref}) \\ 0 & 1 & 0 & (M_y^{Cur} - M_y^{Ref}) \\ 0 & 0 & 1 & (M_z^{Cur} - M_z^{Ref}) \\ 0 & 0 & 0 & 1 \end{bmatrix}$$

where $(M_x^{Ref}, M_y^{Ref}, M_z^{Ref})$ and $(M_x^{Cur}, M_y^{Cur}, M_z^{Cur})$ are the mean of $PC_{Ref}$ and $PC_{Cur}$ respectively.

Then, the final transformation matrix for aligning $PC_{Ref}$ to $PC_{Cur}$ is $$Transf = Transf^{ICP} * Transf^{Init}.$$

Figure 1:
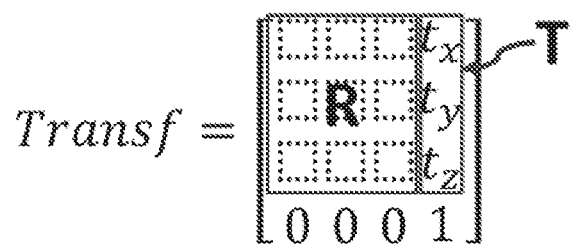
FIG. 1, already described, represents a transformation matrix used in inter-predictive coding of a 3D point cloud.

As this is clear from FIG. 1, within this matrix, the upper left 3×3 sub-matrix represents the rotation, i.e. R in FIG. 1. Moreover, the upper right 3×1 sub-matrix represents the translation, i.e. T in FIG. 1.

Without any further processing, 12 floats are needed to recover the transformation matrix, i.e. 9 for the rotation and 3 for the translation. The cost is apparently too high for compression. Therefore, the transformation matrix needs to be converted to a more compression-friendly format. With reference to the following steps, we describe how to convert R and T to several integers.

Thus, at step 22, the transformation matrix is further converted to a more compression-friendly format. This conversion process also includes a quantization processing.

Two embodiments of converting the rotation transformation are described below.

According to a first embodiment, the rotation transformation is represented by 3 Euler angles. According to Euler's rotation theorem, any 3D rotation may be decomposed into 3 successive elemental rotations, i.e. rotations about the axes of a coordinate system. Therefore, any 3×3 rotation matrix can be described by three angles, which are called as Euler angles. There exist twelve possible sequences of rotation axes, divided in two groups:

Proper Euler angles that comprise the sequences ZXZ, XYX, YZY, ZYZ, XZX, YXY, and Tait-Bryan angles that comprise the sequences XYZ, YZX, ZXY, XZY, ZYX, YXZ. Without loss of generality, here we choose XYZ as the sequence of rotation axes. Then, the corresponding 3 elemental rotations are:
1. The first rotation is by an angle $\theta_X$ about the X-axis using the rotation matrix:

$$R_X = \begin{bmatrix} 1 & 0 & 0 \\ 0 & \cos\theta_X & -\sin\theta_X \\ 0 & \sin\theta_X & \cos\theta_X \end{bmatrix},$$

2. The second rotation is by an angle $\theta_Y$ about the Y-axis using the rotation matrix:

$$R_Y = \begin{bmatrix} \cos\theta_Y & 0 & -\sin\theta_Y \\ 0 & 1 & 0 \\ \sin\theta_Y & 0 & \cos\theta_Y \end{bmatrix},$$

3. The third rotation is by an angle $\theta_Z$ about the Z-axis using the rotation matrix:

$$R_Z = \begin{bmatrix} \cos\theta_Z & -\sin\theta_Z & 0 \\ \sin\theta_Z & \cos\theta_Z & 0 \\ 0 & 0 & 1 \end{bmatrix}.$$

Then, the rotation matrix $$R = \begin{bmatrix} r_{00} & r_{01} & r_{02} \\ r_{10} & r_{11} & r_{12} \\ r_{20} & r_{21} & r_{22} \end{bmatrix}$$

can be written as $$R = R_Z R_Y R_X = \begin{bmatrix} \cos\theta_Z\cos\theta_Y & \cos\theta_Z\sin\theta_Y\sin\theta_X - \sin\theta_Z\cos\theta_X & \cos\theta_Z\sin\theta_Y\cos\theta_X + \sin\theta_Z\sin\theta_X \\ \sin\theta_Z\cos\theta_Y & \sin\theta_Z\sin\theta_Y\sin\theta_X + \cos\theta_Z\cos\theta_X & \sin\theta_Z\sin\theta_Y\cos\theta_X - \cos\theta_Z\sin\theta_X \\ -\sin\theta_Y & \cos\theta_Y\sin\theta_X & \cos\theta_Y\cos\theta_X \end{bmatrix}. \quad (1)$$

Based on (1), R can be described by 3 Euler angles $\theta_X$, $\theta_Y$ and $\theta_Z$ in radians determined by:

$\theta_X = \tan^{-1}(r_{21}, r_{22}), \theta_X \in (-\pi, \pi)$ $\theta_Y = \sin^{-1}(-r_{20}), \theta_Y \in [-\pi/2, \pi/2]$ $\theta_Z = \tan^{-1}(r_{10}, r_{00}), \theta_Z \in (-\pi, \pi]$     (2).

The procedure of converting R to 3 angles in integer degrees is as follows.

Firstly, the 3 float angles are determined using (2).

Secondly, the 3 angles in float radians are quantized to 3 angles in integer degrees as follows, $\theta_i^{Int} = \text{Float2Integer}(\text{sign}(\theta_i)*(|\theta_i|*180.0+0.5))$, $i = x, y$ or $z$.

The procedure of reconstructing R from the 3 angles in integer degrees is as follows.

Firstly, the 3 angles in integer degrees are converted to 3 angles in float radians using $\theta_i = \theta_i^{Int}/180.0$, $i = x$, $y$ or $z$. Secondly, R is reconstructed using (1).

By the conversion described above, the rotation transformation is represented by three integer Euler angles.

It shall be noted that it may be advantageous to use trigonometric Look-Up Tables, LUTs, and to describe the rotation matrix using the indices of the LUTs which would avoid the conversion between trigonometric function values and angles.

According to an embodiment, the use of LUTs is implemented according to the following processing.

As sine function is periodic with period $2\pi$, $$\sin\theta = \begin{cases} \sin\theta, & \text{if } \theta \in [0, \frac{\pi}{2}] \\ \sin(\pi - \theta), & \text{if } \theta \in (\frac{\pi}{2}, \pi] \to (\pi - \theta) \in [0, \frac{\pi}{2}) \\ -\sin(\theta - \pi), & \text{if } \theta \in (\pi, \frac{3\pi}{2}] \to (\theta - \pi) \in (0, \frac{\pi}{2}] \\ -\sin(2\pi - \theta), & \text{if } \theta \in (\frac{3\pi}{2}, 2\pi) \to (2\pi - \theta) \in (0, \frac{\pi}{2}) \end{cases}.$$

So, it is necessary to build a LUT only for $\sin\theta$, $$\theta \in [0, \frac{\pi}{2}].$$

According to a first embodiment, the LUT of $\sin\theta$, $$\theta \in [0, \frac{\pi}{2}]$$

can be built using a uniformly sampling step $\Delta\theta$, for example, $\Delta\theta = 5$ degree. Then, the uniform sampled LUT for $\sin\theta$ is as represented in Table 1.

TABLE 1

| | Uniform LUT for sin θ with Δθ = 5 degree | |
|---|---|---|
| LUT Index | θ in degree | sin θ |
| 0 | 0 | 0.0 |
| 1 | 5 | 0.0871557 |
| 2 | 10 | 0.173648 |
| 3 | 15 | 0.258819 |
| 4 | 20 | 0.34202 |
| 5 | 25 | 0.422618 |
| 6 | 30 | 0.5 |
| 7 | 35 | 0.573576 |
| 8 | 40 | 0.642788 |
| 9 | 45 | 0.707107 |
| 10 | 50 | 0.766044 |
| 11 | 55 | 0.819152 |
| 12 | 60 | 0.866025 |
| 13 | 65 | 0.906308 |
| 14 | 70 | 0.939693 |
| 15 | 75 | 0.965926 |

TABLE 1-continued

Uniform LUT for sin θ with Δθ = 5 degree

| LUT Index | θ in degree | sin θ |
|---|---|---|
| 16 | 80 | 0.984808 |
| 17 | 85 | 0.996195 |
| 18 | 90 | 1.0 |

LUT[i] returns the value of the $i^{th}$ entry of LUT. In this example, the LUT comprises N=19 entries (19 indices i from 0 to 18) and N=19 outputs (19 sine values), with N=(90/Δθ)+1. The LUT comprises a limited number of sine values, one value every Δθ=5 degrees.

According to an embodiment, this LUT is expanded in order to accelerate the determination of integers representing the trigonometric values, especially when there is a big amount of rotation matrices to be encoded.

In this expansion process, a sine value reconstructed using the LUT is computed for each integer value ID'∈[0 . . . 90°/QP$_θ$], by doing linear interpolation between two neighboring entries of LUT. The parameter QP$_θ$ is a quantization step of angles in degrees. For example, QP$_θ$=0.5°.

The usage of this LUT is as follows. Let's suppose that the quantization step of θ in degrees is QP$_9$, for example QP$_θ$=0.5. For any integer ID, the corresponding value of the sine function, sin θ, is determined by:

firstly, determining θ' in degrees by θ'=ID*QP$_θ$,
secondly, converting θ' to θ"∈[0, 360°) by θ"=MOD(θ', 360°) where MOD(x,y) is the modulo operator
thirdly, determining sin θ by $$\sin\theta = LUT(ID) = \text{sign}(\theta'') * \qquad (10)$$

$$\left(LUT\left[\left\lfloor\frac{\theta'''}{\Delta\theta}\right\rfloor\right] + \left(LUT\left[\left\lfloor\frac{\theta'''}{\Delta\theta}\right\rfloor + 1\right] - LUT\left[\left\lfloor\frac{\theta'''}{\Delta\theta}\right\rfloor\right]\right) * \frac{MOD(\theta''',\Delta\theta)}{\Delta\theta}\right),$$

where $$\theta''' = \begin{cases} \theta'', & \text{if } \theta'' \in [0, 90] \\ 180 - \theta'', & \text{if } \theta'' \in (90, 180] \\ \theta'' - 180, & \text{if } \theta \in (180, 270] \\ 360 - \theta'', & \text{if } \theta'' \in (270, 360) \end{cases} \text{ and }$$

$$\text{sign}(\theta'') = \begin{cases} +1, & \text{if } \theta'' \in [0°, 90°] \\ +1, & \text{if } \theta'' \in (90°, 180°] \\ -1, & \text{if } \theta'' \in (180°, 270°] \\ -1, & \text{if } \theta'' \in (270°, 360°) \end{cases}$$

and $$\left\lfloor\frac{\theta}{\Delta\theta}\right\rfloor$$

means the integer part of $$\frac{\theta}{\Delta\theta}.$$

It shall be noted that LUT[i] returns the value of the $i^{th}$ entry of LUT and LUT(ID) returns the query result using ID as query.

To signal this LUT, Δθ, QP$_θ$, and the sin θ values stored in the LUT are transmitted to the decoder side in a bit stream. Another embodiment is to only transmit Δθ and QP$_θ$. The decoder calculates the sin θ values stored in the LUT based on Δθ.

Figure 5:
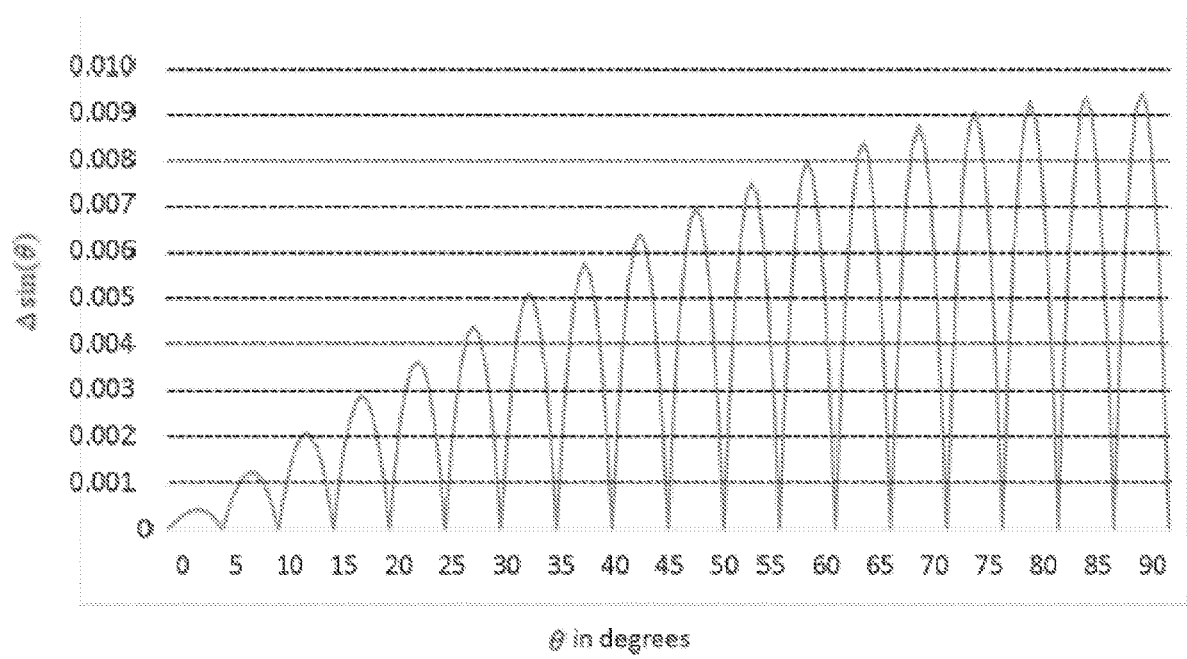
FIG. 5 shows a curve illustrating distortions of sine values in a first embodiment of the present principles.

The drawback of the uniform sampled look-up table is that the distortion determined by $$\Delta\sin(\theta) = \sin\theta - LUT\left(ID = \left\lfloor\frac{\theta}{QP_\theta}\right\rfloor\right)$$

keeps increasing with the increasing of θ, as shown in FIG. 5. This causes coding artefacts. To achieve a quasi-uniform distortion, a non-uniform sampling step is preferred for the generation of the look-up table. Note that $$\left\lfloor\frac{\theta}{\Delta\theta}\right\rfloor$$

means me integer part of $$\frac{\theta}{\Delta\theta}$$

According to a second embodiment, the LUT of sin θ is built using a non-uniformly sampling step Δθ. One example of the non-uniform sampling step is $$\Delta\theta = \begin{cases} \Delta\theta_1 = 6, & \text{if } \theta \in [0°, \theta_{Seg} = 30°] \\ \Delta\theta_2 = 4, & \text{if } \theta \in (\theta_{Seg}, 90°) \end{cases}.$$

Then the non-uniform sampled LUT for sin θ is as follows:

TABLE 2

| LUT Index | θ in degree | sin θ |
|---|---|---|
| 0 | 0 | 0.0 |
| 1 | 6 | 0.104528 |
| 2 | 12 | 0.207912 |
| 3 | 18 | 0.309017 |
| 4 | 24 | 0.406737 |
| 5 | 30 | 0.5 |
| 6 | 34 | 0.559193 |
| 7 | 38 | 0.615661 |
| 8 | 42 | 0.669131 |
| 9 | 46 | 0.71934 |
| 10 | 50 | 0.766044 |
| 11 | 54 | 0.809017 |
| 12 | 58 | 0.848048 |
| 13 | 62 | 0.882948 |
| 14 | 66 | 0.913545 |
| 15 | 70 | 0.939693 |
| 16 | 74 | 0.961262 |
| 17 | 78 | 0.978148 |
| 18 | 82 | 0.990268 |
| 19 | 86 | 0.997564 |
| 20 | 90 | 1 |

Then, this LUT is expanded in order to accelerate to accelerate the determination of integers representing the trigonometric values, especially when there is a big amount of rotation matrices to be encoded.

In this second embodiment, for any integer ID'∈[0 . . . 90°*QP$_θ$], a corresponding value of sine function, reconstructed using LUT, is determined by ReconSine function as defined by the following:

$$ReconSine(ID') = LUT(ID') = \begin{cases} \left(\left(LUT\left[\left\lfloor\frac{\theta'''}{\Delta\theta_1}\right\rfloor\right]\right) + \left(LUT\left[\left\lfloor\frac{\theta'''}{\Delta\theta_1}\right\rfloor + 1\right]\right) - LUT\left[\left\lfloor\frac{\theta'''}{\Delta\theta_1}\right\rfloor\right]\right) * \frac{MOD(\theta''', \Delta\theta_1)}{\Delta\theta_1}, & \theta''' \in [0°, \theta_{Seg}] \\ \left(LUT[ID_{Low}] + (LUT[ID_{Low}+1] - LUT[ID_{Low}]) * \frac{\left\lfloor\frac{\theta''' - \theta_{Seg}}{\Delta\theta_2}\right\rfloor -}{\frac{\theta_{Seg}}{\Delta\theta_2}}\right), & \theta''' \in (\theta_{Seg}, 90°] \end{cases}$$

Where
$\theta''' = ID'*QP_\theta$ $\left\lfloor\frac{\theta'''}{\Delta\theta}\right\rfloor$ means the integer part of $\frac{\theta'''}{\Delta\theta}$ $ID_{Low} = \left\lfloor\frac{\theta_{Seg}}{\Delta\theta_1}\right\rfloor + \left\lfloor\frac{\theta''' - \theta_{Seg}}{\Delta\theta_2}\right\rfloor$ These trigonometric function values are computed only once for any $ID' \in [0; 90*QP_\theta]$ and stored. Later on, they can be retrieved.

$\Delta\theta_1$, $\Delta\theta_2$, $\theta_{Seg}$, $QP_\theta$, and the sin θ values of LUT are transmitted to the decoder side in the bit stream. Another embodiment is to only transmit $\Delta\theta_1$, $\Delta\theta_2$, $\theta_{Seg}$ and $QP_\theta$. The decoder calculates the sin θ values stored in the LUT based on $\Delta\theta_1$, $\Delta\theta_2$ and $\theta_{Seg}$.

Figures 6, 7:
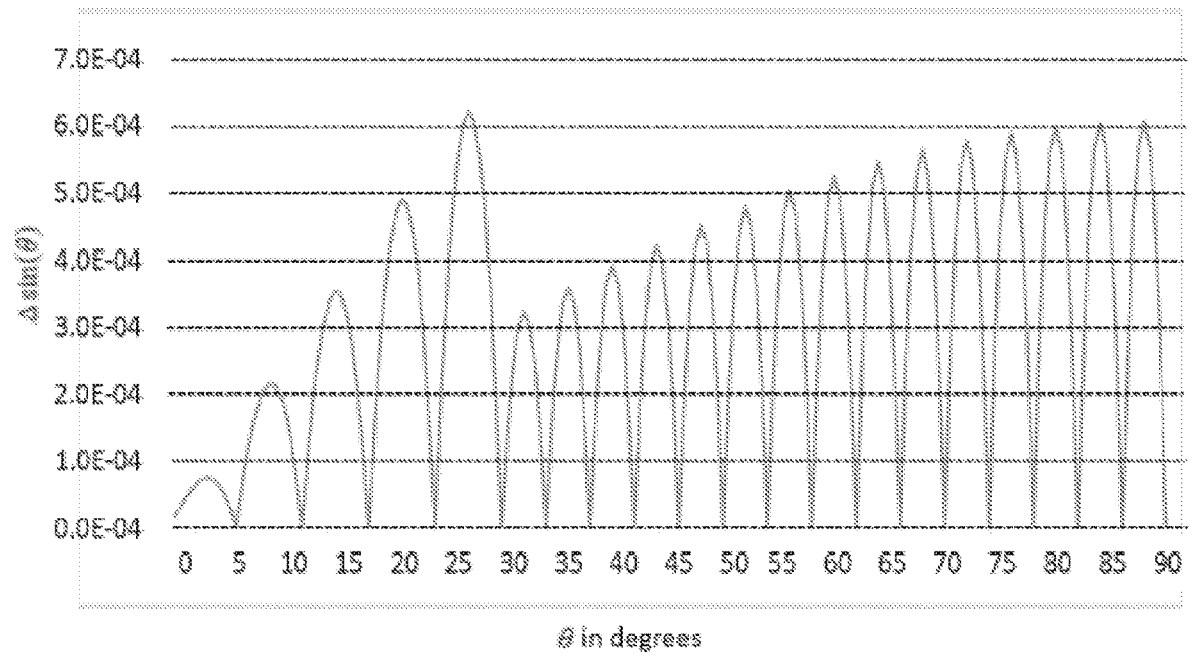
FIG. 6 shows a curve illustrating distortions of sine values in a second embodiment of the present principles.
FIG. 7 a decomposition of the transformation matrix used in inter-predictive coding of a 3D point cloud, according to an embodiment of the present disclosure.

The resultant distortion $$\Delta\sin(\theta) = \sin\theta - LUT\left(ID' = \left\lfloor\frac{\theta}{QP_\theta}\right\rfloor\right)$$

is shown in FIG. 6. This distortion is reduced versus the distortion of the first embodiment.

Based on (1), R can be described by 3 pairs of trigonometric values $$\left(\sin\theta_Y = -r_{20}, \cos\theta_Y = \sqrt[2]{r_{21}^2 + r_{22}^2}\right),$$

$$\left(\sin\theta_X = \frac{r_{21}}{\sqrt[2]{r_{21}^2 + r_{22}^2}}, \cos\theta_X = \frac{r_{22}}{\sqrt[2]{r_{21}^2 + r_{22}^2}}\right) \text{ and}$$

$$\left(\sin\theta_Z = \frac{r_{10}}{\sqrt[2]{r_{21}^2 + r_{22}^2}}, \cos\theta_Z = \frac{r_{00}}{\sqrt[2]{r_{21}^2 + r_{22}^2}}\right).$$

Note that $\cos\theta_Y \geq 0$ because $\theta_Y \in [-\pi/2, \pi/2]$.

For a pair of trigonometric values $(\sin\delta, \cos\delta)$, an integer $ID_\delta$ to be used as the query of the LUT built above for reconstructing $(\sin\delta, \cos\delta)$ is determined by:

$$ID_\delta = \begin{cases} 0, & \text{if } \sin\delta == 0.0 \text{ and } \cos\delta > 0.0, \\ ID'_\delta = \min_{ID}||\sin\delta| - ReconSine(ID)|, & \text{if } \sin\delta > 0.0 \text{ and } \cos\delta > 0.0, \\ 90*QP_\theta, & \text{if } \sin\delta > 0.0 \text{ and } \cos\delta == 0.0, \\ ID'_\delta + 90*QP_\theta, & \text{if } \sin\delta > 0.0 \text{ and } \cos\delta < 0.0, \\ 180*QP_\theta, & \text{if } \sin\delta == 0.0 \text{ and } \cos\delta < 0.0, \\ ID'_\delta + 180*QP_\theta, & \text{if } \sin\delta < 0.0 \text{ and } \cos\delta < 0.0, \\ 270*QP_\theta, & \text{if } \sin\delta < 0.0 \text{ and } \cos\delta == 0, \\ ID'_\delta + 270*QP_\theta, & \text{if } \sin\delta < 0.0 \text{ and } \cos\delta > 0.0. \end{cases} \quad (3)$$

If LUT is built by uniform sampling and isn't expanded, $ID'_\delta$ is determined as follows $$ID'_\delta = INDEX_{Unif} * \Delta\theta/QP_\theta + \left\lfloor \frac{|\sin\delta| - LUT[INDEX_{Unif}]}{LUT[INDEX_{Unif}+1] - LUT[INDEX_{Unif}]} * \Delta\theta/QP_\theta \right\rfloor, \quad (4)$$

where $LUT[INDEX_{Unif}] \leq |\sin\delta|$ and $LUT[INDEX_{Unif}+1] \geq |\sin\delta|$.

If LUT is built by non-uniform sampling and isn't expanded, $ID'_\delta$ is determined as follows $$ID_\delta = \begin{cases} INDEX_{NonUnif} * \frac{\Delta\theta_1}{QP_\theta} + \left\lfloor \frac{|\sin\delta| - LUT[INDEX_{NonUnif}]}{LUT[INDEX_{nonUnif}+1] - LUT[INDEX_{NonUnif}]} * \frac{\Delta\theta_1}{QP_\theta} \right\rfloor, \\ \qquad \text{if } INDEX_{NonUnif} < \theta_{seg}/\Delta\theta_1 \\ \frac{\theta_{seg}}{QP_\theta} + \left(INDEX_{NonUnif} - \frac{\theta_{seg}}{\Delta\theta_1}\right) * \frac{\Delta\theta_2}{QP_\theta} + \left\lfloor \frac{|\sin\delta| - LUT[INDEX_{NonUnif}]}{LUT[INDEX_{NonUnif}+1] - LUT[INDEX_{NonUnif}]} * \frac{\Delta\theta_2}{QP_\theta} \right\rfloor, \\ \qquad \text{if } INDEX_{NonUnif} \geq \theta_{seg}/\Delta\theta_1 \end{cases} \quad (5)$$

where $LUT[INDEX_{NonUnif}] \leq |\sin\delta|$ and $LUT[INDEX_{NonUnif}+1] \geq |\sin\delta|$.

If only one trigonometric value is to be encoded, such as $\cos\delta$, $ID_\delta$ is determined as follows.

Firstly, an integer $ID''_\delta$ is determined using $|\cos\delta|$. If LUT is expanded, $ID''_\delta$ is set as the integer value which minimizes $||\cos\delta| - \text{ReconSine}(ID)|$, $ID \in [0 \ldots 90/QP_\theta]$. If LUT is not expanded, $ID''_\delta$ is determined using (4) and (5) with $\sin\delta$ replaced by $\cos\delta$. Secondly, $ID_\delta$ is determined $$ID_\delta = \begin{cases} ID''_\delta, & \text{if } \cos\delta > 0.0, \\ 0, & \text{if } \cos\delta == 0.0, \\ \frac{90}{QP_\theta} + ID''_\delta, & \text{if } \cos\delta < 0.0, \end{cases}$$

Then, R can be represented by three integers $ID_{\theta_X}$, $ID_{\theta_Y}$ and $ID_{\theta_Z}$ determined by (3) with $\delta=\theta_X$, $\delta=\theta_Y$ and $\delta=\theta_Z$ respectively.

The determined integer values ID are encoded into a bitstream F1. In an embodiment, the integer values ID are entropically encoded.

According to a second embodiment, the rotation transformation is represented by a unit quaternion Quatern(qw, qx, qy, qz), determined by:

$$qw = \sqrt[2]{1 + r_{00} + r_{11} + r_{22}}/2 = \cos\alpha/2,$$
$$qx = (r_{21} - r_{12})/(4*qw) = \sin\alpha/2\cos\beta_x,$$
$$qy = (r_{02} - r_{20})/(4*qw) = \sin\alpha/2\cos\beta_y,$$
$$qz = (r_{10} - r_{01})/(4*qw) = \sin\alpha/2\cos\beta_z.$$

Then, R can be reconstructed from Quatern(qw, qx, qy, qz) by $$\begin{pmatrix} 1-2*qy^2-2*qz^2 & 2*qx*qy-2*qz*qw & 2*qx*qz+2*qy*qw \\ 2*qx*qy+2*qz*qw & 1-2*qx^2-2*qz^2 & 2*qy*qz-2*qx*qw \\ 2*qx*qz-2*qy*qw & 2*qy*qz+2*qx*qw & 1-2*qx^2-2*qy^2 \end{pmatrix}$$

Where Quatern(qw, qx, qy, qz) describes a rotation by an angle in radian, qw, and by a rotation axis (qx, qy, qz) which is a unit vector.

Therefore, the rotation matrix $R^{3D}$ can be described by a pair of cosine/sine values and 3 cosine values:

$$(\cos\alpha/2 = qw, \sin\alpha/2 = \sqrt[2]{1-qw^2}),$$
$$\cos\beta_x = \frac{qx}{\sqrt[2]{1-qw^2}},$$
$$\cos\beta_y = \frac{qy}{\sqrt[2]{1-qw^2}} \text{ and}$$
$$\cos\beta_z = \frac{qz}{\sqrt[2]{1-qw^2}}.$$

Quatern(qw, qx, qy, qz) is further converted to a compression friendly format as follows:

qw is converted by $qw^{Int}$=Float2Integer((qw*180.0+0.5)), qx and qy are quantized by $qx^{Int}$=Float2Integer (qx*$QP^{Quatern}$+0.5) and $qy^{Int}$=Float2Integer (qy*$QP^{Quatern}$+0.5), where $QP^{Quatern}$ is the quantization parameter for Quatern(qw, qx, qy, qz). As (qx, qy, qz) is a unit vector, only the sign of qz needs to be signaled, i.e. output to the compressed bitstream.

By the conversion described above, the rotation transformation is described by four integers representing a unit quaternion.

Concerning the translation transformation, the range of the raw translation data, T ($t_x$, $t_y$, $t_z$), is very big, which may jeopardize the rate-distortion (RD) performance of the codec. To achieve better performance, the raw translation data needs to be further converted also.

Figure 4:
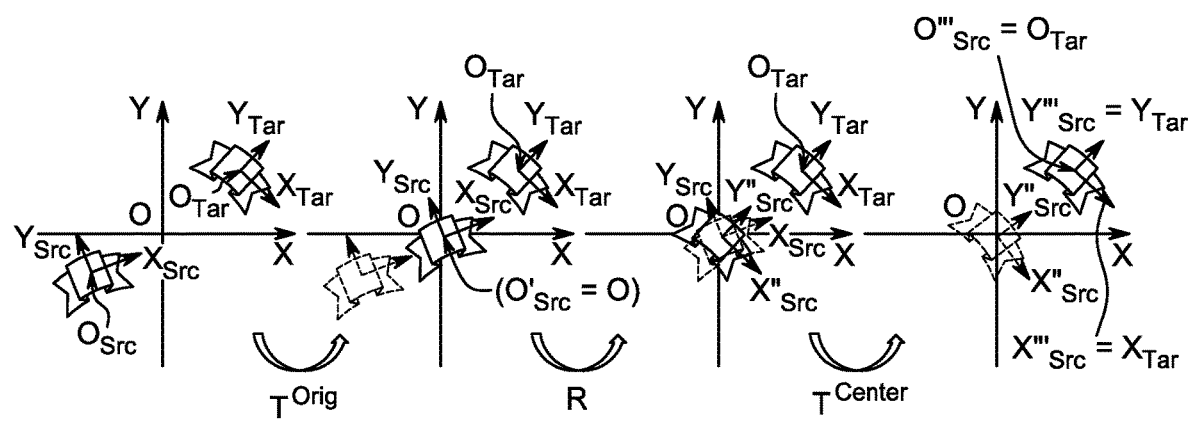
FIG. 4 shows an example of a combination of translation and rotation transformations in 2D.

Any combination of translation and rotation operations can be approximated by 3 successive transformations. FIG. 4 shows a 2D example.

Let's suppose that we want to transform one 3D object $OBJ_{Src}$ to get it aligned with another 3D object $OBJ_{Tar}$ by translation and rotation operations. Firstly, $OBJ_{Src}$ is translated to move its centroid $O_{Src}$ to O, the origin of the world coordinate system. Secondly, the translated $OBJ_{Src}$ is rotated to align the axes of its object coordinate system with the axes of the object coordinate system of $OBJ_{Tar}$. Thirdly, the translated and then rotated $OBJ''_{Src}$ is again translated to move its centroid to the centroid of $OBJ_{Tar}$. By now, the transformed $OBJ_{Src}$ gets aligned with $OBJ_{Tar}$. The above three transformations are called as $T^{Orig}$, R and $T^{Center}$ respectively.

Therefore, the transformation matrix Transf can be rewritten as represented in FIG. 7, which means that the translation vector can be written as $T=R*T^{Orig}+T^{Center}$.

Let's denote the mean of the points falling into the candidate reference 3D-Block as $M^{Ref}(M_x^{Ref}, M_y^{Ref}, M_z^{Ref})$ which can be determined by a vector pointing to the candidate reference 3D-block.

Let's also consider that the mean of the points falling into the current 3D-block is estimated as $C^{Cur}$, the center of the current 3D-Block. Then, $T^{Orig}=-M_{Ref}$ and $T^{Center}=C^{Cur}$.

Having R already encoded and decoded to a reconstructed rotation matrix $R^{Rec}$, then an estimation of T can be determined by $$T^* = R^{Rec}*(-M^{Ref})+C^{cur}.$$

Instead of encoding T, according to the present disclosure ΔT, the estimation error of T, which is defined by ΔT=T–T* is encoded.

The range of ΔT $(t_x^{\Delta},t_y^{\Delta},t_z^{\Delta})$ is approximately the size of a 3D-Block. For example, when the size of the 3D-block is 16×16×16, the range of ΔT is $t_x^{\Delta} \in [-7,9] t_z^{\Delta} \in [-7,9] t_z^{\Delta} \in [-7,9]$, $t_x^{\Delta}$, $t_y^{\Delta}$ and $t_z^{\Delta}$ being quantized to integers before encoding.

Then, T is reconstructed as $T^{Recons}=T^*+\Delta T^{Int}$, where $\Delta T^{Int}$ elements are the quantized $t_x^{\Delta}$, $t_y^{\Delta}$ and $t_z^{\Delta}$.

By this conversion, the translation transformation is represented by an integer 3D vector representing the estimation error of the translation transformation.

After that, at step 24, the transformation matrix is reconstructed from the converted result. Then, the transformed subset of the reference frame 8 falling into the candidate reference block, noted as $PC_{Ref}^{Transf}$ is determined using the reconstructed transformation matrix $Transf^{Recons}$ according to:

$$PC_{Ref}^{Transf}=Transf^{Recons}*PC_{Ref}.$$

After that, a scalar prediction error is determined, at step 26, by comparing the current block 4 with $PC_{Ref}^{Trans}$.

According to an embodiment, the prediction error is determined using the weighted sum of the following two factors:

1)

$$E_{PC_{Cur},PC_{Ref}^{Transf}},$$

the mean squared geometric error (MSGE hereafter) in the current block $PC_{Cur}$ relative to the transformed candidate reference block $PC_{Ref}^{Transf}$,

2)

$$E_{PC_{Ref}^{Transf},PC_{Cur}},$$

the mean squared geometric error (MSGE hereafter) in $PC_{Ref}^{Transf}$ relative to $PC_{Cur}$ According to an example, both weights are chosen equal to 0.5.

According to another embodiment, the prediction error is determined using the following two factors:

1)

$$E_{PC_{Cur},PC_{Ref}^{Transf}},$$

the mean squared geometric error (MSGE hereafter) in $PC_{Cur}$ relative to $PC_{Ref}^{Transf}$,

2)

$$E_{PC_{Ref}^{Transf},PC_{Cur}}^{MaxN},$$

the mean of the maximum MAX_ERR_POINT_NUM squared errors among the squared geometric errors of the points in $PC_{Ref}^{Transf}$ relative to $PC_{Cur}$, where MAX_ERR_POINT_NUM is determined by MAX_ERR_POINT_NUM=MAX_ERR_POINT_RATIO* $PtNum^{PC_{Ref}}$, where $PtNum^{PC_{Ref}}$ is the number of points in the candidate reference block $PC_{Ref}$ and MAX_ERR_POINT_RATIO is a predefined constant, for instance equal to 0.1.

In this embodiment, $$E_{PC_{Ref}^{Transf},PC_{Cur}}^{MaxN}$$

is used to penalize the points in the transformed candidate reference block $PC_{Ref}^{Transf}$, which are far away from the current block $PC_{Cur}$. The prediction error is a weighted sum of the above two factors and determined by:

$$E_{Pred} = w_{Cur,Ref} * E_{PC_{Cur},PC_{Ref}^{Transf}} + w_{Ref,Cur} * E_{PC_{Ref}^{Transf},PC_{Cur}}^{MaxN},$$

where $w_{Cur,Ref}=w_{Ref,Cur}=\frac{1}{2}$, for example.

After comparing all the candidate reference blocks with the current block, if the minimum prediction error obtained is within a user-defined threshold, the current block 4 will be coded using inter prediction and the reference 3D-block with the minimum prediction error is chosen, at step 28, as the matched reference 3D-block.

According to an embodiment, at step 29, the 3D motion information is further encoded by Huffman coding. For the current 3D-block with left bottom corner $(x_{min}^{Cur}, y_{min}^{Cur}, z_{min}^{Cur})$, let's suppose that the left bottom corner of the matched reference 3D-block is $(x_{min}^{MatchedRef}, y_{min}^{MatchedRef}, z_{min}^{MatchedRef})$.

The vector pointing to the matched reference 3D-block is signaled as $(x_{min}^{MatchedRef}-x_{min}^{Cur}, y_{min}^{MatchedRef}-y_{min}^{Cur}, z_{min}^{MatchedRef}-z_{min}^{Cur})$ and the index of the reference frame in the GOP.

Then, different Huffman coders are designed for $\{i_{min}^{MatchedRef}-i_{min}^{Cur}, i=x, y \text{ or } z\}$ the integer Euler angles or the integers representing the unit quaternion and the integer vectors representing the translation vector estimation error respectively according to the distribution probabilities of various code words. Each Huffman coder is designed according to the occurring probabilities of different code words for each type of data. For example, the occurring probabilities and Huffman codings of all code words for $x_{min}^{MatchedRef}-x_{min}^{Cur}$ are as shown in Table 3.

TABLE 3

| code word | occurring probability | Huffman coding |
|---|---|---|
| 0 | 40% | 0 |
| −2 | 20% | 100 |
| +2 | 20% | 101 |
| −4 | 10% | 110 |
| +4 | 10% | 111 |

Then, a prediction residual, which is to be encoded and output to the compressed bitstream, is determined, at step 30, by comparing the current 3D-block 4 and the matched reference block selected at step 28.

It is interesting to note that the prediction residual is different from the prediction error determined at step 26. The prediction residual is a group of 3D vectors to be used by the decoder to reconstruct the current block 4.

Indeed, for each point in the matched reference block $PC_{Ref}$, denoted as $P^{Ref}$, its prediction residual to be encoded later is determined by $P^{Cur} - P^{TransfRef}$ where $P^{TransfRef} = Tranf_{Ref \rightarrow Cur} * P^{Ref}$ and $P^{Cur}$ is the point in the current block $PC_{Cur}$ which is closest to the transformed reference block $P^{TransfRef}$.

The prediction residuals are then sorted according to the decoding sequence of all points in the matched reference block and encoded entropically by an arithmetic coder.

Figure 8:
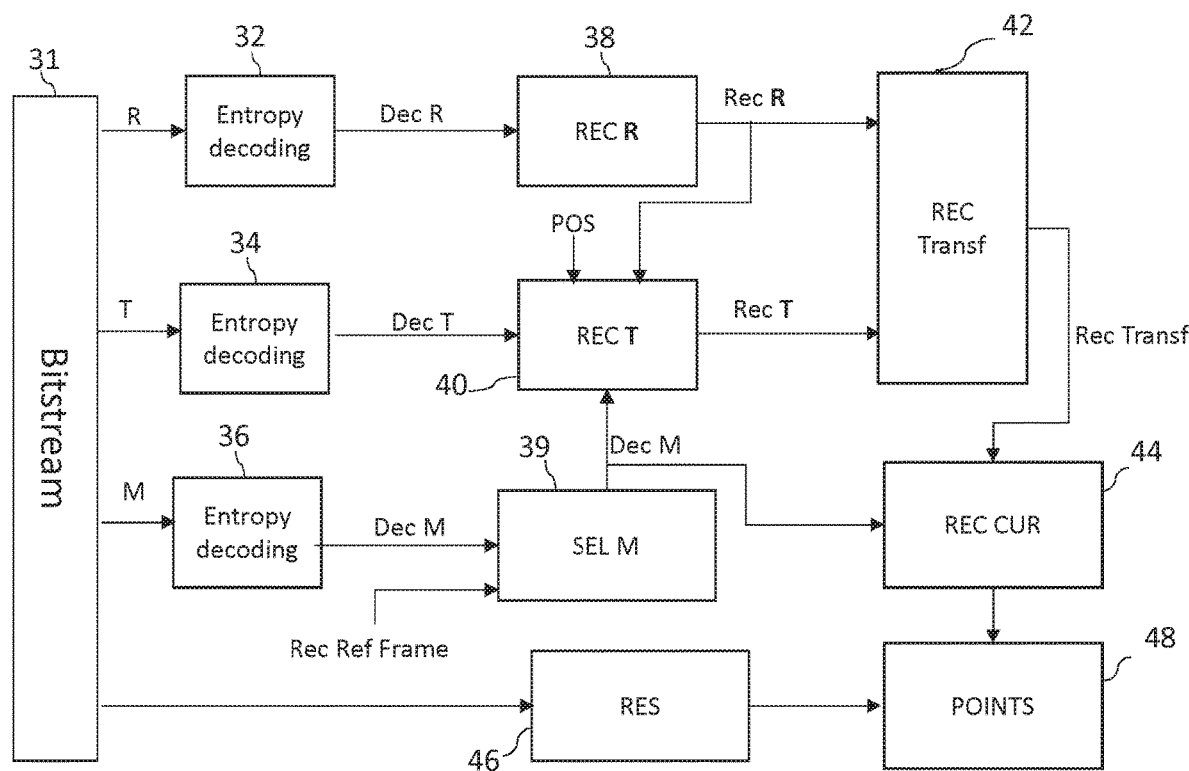
FIG. 8 is a flowchart showing the steps of the method of decoding a point cloud, according to an embodiment of the present invention.

FIG. 8 is a block diagram showing the steps of the inter-predictive decoding of the bitstream 31 generated by the encoding method described with reference to FIG. 3, in order to reconstruct a current 3D-block of the point cloud.

A first bitstream data field R contains the encoded rotation representative; i.e. the encoded integer Euler angles or the integers representing the unit quaternion.

A second bitstream data field T contains the encoded translation estimation error, i.e. the encoded integer vectors representing the translation vector estimation error.

A third bitstream data field M contains a vector pointing to the matched reference 3D-block.

The bitstream data fields R, T and M are entropy decoded at steps 32, 34 and 36 respectively.

Then, at step 38, the rotation matrix is reconstructed from the decoded rotation representative.

When LUT are used, the method for decoding comprises the following steps:

- decoding, from the bitstream data field R, the integer values ID representing the rotation matrix; the integer values ID representing the rotation matrix are generated and the LUT table is possibly generated;
- associating an integer value with each of a number N trigonometric function values at least from a look-up table; in this step, the look-up table LUT is reconstructed. Optionally, the reconstructed trigonometric function values ReconSine (ID') are pre-calculated for any integer ID'∈ [0 . . . 90°/QP$_\theta$];
- for a decoded integer value ID, determining the corresponding reconstructed sin and/or cos function values, ReconSine(ID) and ReconCosine(ID), representing the rotation matrix using ID and the look-up-table LUT. If there was no pre-calculation, when LUT is built by uniform sampling and both ReconSine(ID) and ReconCosine(ID) needs to be determined, ReconSine(ID) and ReconCosine(ID) are determined by $$ReconSine(ID) == sign(\theta'') *$$

$$\left(LUT\left[\left\lfloor\frac{\theta'''}{\Delta\theta}\right\rfloor\right] + \left(LUT\left[\left\lfloor\frac{\theta'''}{\Delta\theta}\right\rfloor + 1\right] - LUT\left[\left\lfloor\frac{\theta'''}{\Delta\theta}\right\rfloor\right]\right) * \frac{MOD(\theta''', \Delta\theta)}{\Delta\theta}\right)$$

$$ReconCosine(ID) = signcos(\theta'') *$$

$$\left(LUT\left[\left\lfloor\frac{90° - \theta'''}{\Delta\theta}\right\rfloor\right] + \left(LUT\left[\left\lfloor\frac{90° - \theta'''}{\Delta\theta}\right\rfloor + 1\right] - LUT\left[\left\lfloor\frac{90° - \theta'''}{\Delta\theta}\right\rfloor\right]\right) *$$

$$\frac{MOD(90° - \theta''', \Delta\theta)}{\Delta\theta}\right)$$

where $\theta'' = MOD(\theta', 360°)$ and $\theta'' \in [0, 360°)$, where MOD(x,y) is the modulo operator and $\theta' = ID * QP_\theta$;

$$\left\lfloor\frac{\theta'''}{\Delta\theta}\right\rfloor$$

means the integer part of $$\frac{\theta'''}{\Delta\theta}$$

$$\theta''' = \begin{cases} \theta'', & \text{if } \theta'' \in [0, 90] \\ 180 - \theta'', & \text{if } \theta'' \in (90, 180] \\ \theta'' - 180, & \text{if } \theta \in (180, 270] \\ 360 - \theta'', & \text{if } \theta'' \in (270, 360) \end{cases}$$

and $$sign(\theta'') = \begin{cases} +1, & \text{if } \theta'' \in [0°, 90°] \\ +1, & \text{if } \theta'' \in (90°, 180°] \\ -1, & \text{if } \theta'' \in (180°, 270°] \\ -1, & \text{if } \theta'' \in (270°, 360°) \end{cases}$$

$$signcos(\theta'') = \begin{cases} +1, & \text{if } \theta'' \in [0°, 90°] \\ -1, & \text{if } \theta'' \in (90°, 180°] \\ -1, & \text{if } \theta'' \in (180°, 270°] \\ +1, & \text{if } \theta'' \in (270°, 360°) \end{cases}.$$

The formula $$\left(LUT\left[\left\lfloor\frac{\theta'''}{\Delta\theta}\right\rfloor\right] + \left(LUT\left[\left\lfloor\frac{\theta'''}{\Delta\theta}\right\rfloor + 1\right] - LUT\left[\left\lfloor\frac{\theta'''}{\Delta\theta}\right\rfloor\right]\right) * \frac{MOD(\theta''', \Delta\theta)}{\Delta\theta}\right)$$

is a piecewise linear interpolation for any angle $\theta''' \in [0°; 90°]$, And sign($\theta''$) sets the sign of sin $\theta$. And signcos($\theta''$) sets the sign of cos $\theta$.

If there was no pre-calculation, when LUT is built by uniform sampling and only ReconCosine(ID) needs to be determined (when a rotation matrix is encoded by being converted to a quaternion), ReconCosine(ID) are determined by $$ReconCosine(ID) = signcos1(\theta''_{Cos}) *$$

$$\left(LUT\left[\left\lfloor\frac{\theta'''_{Cos}}{\Delta\theta}\right\rfloor\right] + \left(LUT\left[\left\lfloor\frac{\theta'''_{Cos}}{\Delta\theta}\right\rfloor + 1\right] - LUT\left[\left\lfloor\frac{\theta'''_{Cos}}{\Delta\theta}\right\rfloor\right]\right) * \frac{MOD(\theta'''_{Cos}, \Delta\theta)}{\Delta\theta}\right)$$

where $$\theta''_{Cos} = \begin{cases} \theta'_{Cos}, & \text{if } \theta'_{Cos} < 180° \\ 180°, & \text{if } \theta'_{Cos} \geq 180° \end{cases} \text{ and } \theta''_{Cos} \in [0, 180°],$$

where $\theta'_{Cos} = ID*QP_\theta$;

$$\left\lfloor \frac{\theta''_{Cos}}{\Delta\theta} \right\rfloor$$

means the integer part of $$\frac{\theta'''_{Cos}}{\Delta\theta}$$

$$\theta'''_{Cos} = \begin{cases} \theta''_{Cos}, & \text{if } \theta''_{Cos} \in [0°, 90°] \\ \theta''_{Cos} - 90°, & \text{if } \theta''_{Cos} \in (90°, 180°] \end{cases}$$

and $$\text{signcos1}(\theta''_{Cos}) = \begin{cases} +1, & \text{if } \theta''_{Cos} \in [0°, 90°] \\ -1, & \text{if } \theta''_{Cos} \in (90°, 180°] \end{cases}$$

If there was no pre-calculation, when LUT is built by non-uniform sampling, and both ReconSine(ID) and ReconCosine(ID) need to be determined, ReconSine(ID) and ReconCosine(ID) are determined by $$ReconSine(ID) == \begin{cases} \text{sign}(\theta'') * \left( LUT\left[\left\lfloor \frac{\theta'''}{\Delta\theta_1} \right\rfloor\right] + \left(LUT\left[\left\lfloor \frac{\theta'''}{\Delta\theta_1} \right\rfloor + 1\right] - LUT\left[\left\lfloor \frac{\theta'''}{\Delta\theta_1} \right\rfloor\right]\right) * \frac{MOD(\theta''', \Delta\theta_1)}{\Delta\theta_1} \right), & \theta''' \in [0°, \theta_{seg}] \\ \text{sign}(\theta'') * \left( LUT[ID_{Low}] + (LUT[ID_{Low}+1] - LUT[ID_{Low}]) * \frac{\theta''' - \left\lfloor \frac{\theta''' - \theta_{seg}}{\Delta\theta_2} \right\rfloor - \theta_{seg}}{\Delta\theta_2} \right), & \theta''' \in (\theta_{seg}, 90°] \end{cases}$$

$$ReconCosine(ID) == \begin{cases} \text{signcos}(\theta'') * \left( LUT\left[\left\lfloor \frac{90° - \theta'''}{\Delta\theta_1} \right\rfloor\right] + \left(LUT\left[\left\lfloor \frac{90° - \theta'''}{\Delta\theta_1} \right\rfloor + 1\right] - LUT\left[\left\lfloor \frac{90° - \theta'''}{\Delta\theta_1} \right\rfloor\right]\right) * \frac{MOD(90° - \theta''', \Delta\theta_1)}{\Delta\theta_1} \right), & \theta''' \in [90° - \theta_{seg}, 90°] \\ \text{signcos}(\theta'') * \left( LUT[ID_{LowCos}] + (LUT[ID_{LowCos}+1] - LUT[ID_{LowCos}]) * \frac{90° - \theta''' - \left\lfloor \frac{90° - \theta''' - \theta_{seg}}{\Delta\theta_2} \right\rfloor - \theta_{seg}}{\Delta\theta_2} \right), & \theta''' \in [\theta_{seg}, 90° - \theta_{seg}) \end{cases}$$

where $\theta'' = MOD(\theta', 360°)$ and $\theta'' \in [360°)$ where $MOD(x, y)$ is the modulo operator;

$$\left\lfloor \frac{\theta'''}{\Delta\theta} \right\rfloor$$

means the integer part of $$\frac{\theta'''}{\Delta\theta}$$

$$ID_{Low} = \left\lfloor \frac{\theta_{Seg}}{\Delta\theta_1} \right\rfloor + \left\lfloor \frac{\theta''' - \theta_{Seg}}{\Delta\theta_2} \right\rfloor,$$

$$ID_{LowCos} = \left\lfloor \frac{\theta_{Seg}}{\Delta\theta_1} \right\rfloor + \left\lfloor \frac{90° - \theta''' - \theta_{Seg}}{\Delta\theta_2} \right\rfloor$$

$$\theta''' = \begin{cases} \theta'', & \text{if } \theta'' \in [0, 90] \\ 180 - \theta'', & \text{if } \theta'' \in (90, 180] \\ \theta'' - 180, & \text{if } \theta \in (180, 270] \\ 360 - \theta'', & \text{if } \theta'' \in (270, 360) \end{cases}$$

and $$\text{sign}(\theta'') = \begin{cases} +1, & \text{if } \theta'' \in [0°, 90°] \\ +1, & \text{if } \theta'' \in (90°, 180°] \\ -1, & \text{if } \theta \in (180°, 270°] \\ -1, & \text{if } \theta'' \in (270°, 360°) \end{cases}.$$

$$\text{igncos}(\theta'') = \begin{cases} +1, & \text{if } \theta'' \in [0°, 90°] \\ -1, & \text{if } \theta'' \in (90°, 180°] \\ -1, & \text{if } \theta'' \in (180°, 270°] \\ +1, & \text{if } \theta'' \in (270°, 360°) \end{cases}$$

If there was no pre-calculation, when LUT is built by non-uniform sampling and only ReconCosine(ID) needs to be determined (when a rotation matrix is encoded by being converted to a quaternion), ReconCosine(ID) are determined by $$ReconCosine(ID) == \begin{cases} \text{signcos}1(\theta''_{Cos}) * \left( LUT\left[\left\lfloor \frac{\theta'''_{Cos}}{\Delta\theta_1} \right\rfloor\right] + \left(LUT\left[\left\lfloor \frac{\theta'''_{Cos}}{\Delta\theta_1} \right\rfloor + 1\right] - LUT\left[\left\lfloor \frac{\theta'''_{Cos}}{\Delta\theta_1} \right\rfloor\right]\right) * \frac{\overset{MOD}{(\theta'''_{Cos}, \Delta\theta_1)}}{\Delta\theta_1} \right), \theta'''_{Cos} \in [0°, \theta_{seg}] \\ \text{signcos}1(\theta''_{Cos}) * \left( LUT[ID_{Low}] + (LUT[ID_{Low}+1] - LUT[ID_{Low}]) * \frac{\theta'''_{Cos} - \left\lfloor \frac{\theta'''_{Cos} - \theta_{seg}}{\Delta\theta_2} \right\rfloor - \theta_{seg}}{\Delta\theta_2} \right), \theta'''_{Cos} \in (\theta_{seg}, 90°] \end{cases}$$

(15)

where $$\theta''_{Cos} = \begin{cases} \theta'_{Cos}, & \text{if } \theta'_{Cos} < 180° \\ 180°, & \text{if } \theta'_{Cos} \geq 180° \end{cases}$$

(20)

and $\theta''_{Cos} \in [0, 180°]$, where $\theta'_{Cos} = ID*QP_\theta$;

$$\left\lfloor \frac{\theta'''_{Cos}}{\Delta\theta} \right\rfloor$$

means the integer part of $$\frac{\theta'''_{Cos}}{\Delta\theta},$$

$$ID_{Low} = \left\lfloor \frac{\theta_{Seg}}{\Delta\theta_1} \right\rfloor + \left\lfloor \frac{\theta'''_{Cos} - \theta_{Seg}}{\Delta\theta_2} \right\rfloor,$$

$$\theta'''_{Cos} = \begin{cases} \theta''_{Cos}, & \text{if } \theta''_{Cos} \in [0°, 90°] \\ \theta''_{Cos} - 90°, & \text{if } \theta''_{Cos} \in (90°, 180°] \end{cases}$$

and $$\text{signcos}1(\theta''_{Cos}) = \begin{cases} +1, & \text{if } \theta''_{Cos} \in [0°, 90°] \\ -1, & \text{if } \theta''_{Cos} \in (90°, 180°] \end{cases}$$

If there was a pre-calculation and both ReconSine(ID) and ReconCosine(ID) need to be determined, ReconSine(ID) and ReconCosine(ID) are determined by $$ReconSine(ID) = \text{sign}(\theta'') * ReconSine(ID''')$$

$$ReconCosine(ID) = \text{signcos}(\theta'') * ReconSine\left(\frac{90}{QP_\theta} - ID'''\right)$$

where $\theta''=\text{MOD}(\theta', 360°)$ and $\theta'' \in [0,360°)$, where $\text{MOD}(x,y)$ is the modulo operator and $\theta'=ID*QP_\theta$;

$$ID''' = \frac{\theta'''}{QP_\theta}, \theta''' = \begin{cases} \theta'', & \text{if } \theta'' \in [0, 90] \\ 180 - \theta'', & \text{if } \theta'' \in (90, 180] \\ \theta'' - 180, & \text{if } \theta \in (180, 270] \\ 360 - \theta'', & \text{if } \theta'' \in (270, 360] \end{cases};$$

$$\text{sign}(\theta'') = \begin{cases} +1, & \text{if } \theta'' \in [0°, 90°] \\ +1, & \text{if } \theta'' \in (90°, 180°] \\ -1, & \text{if } \theta'' \in (180°, 270°] \\ -1, & \text{if } \theta'' \in (270°, 360°) \end{cases}$$

and $$\text{signcos}(\theta'') = \begin{cases} +1, & \text{if } \theta'' \in [0°, 90°] \\ +1, & \text{if } \theta'' \in (90°, 180°] \\ -1, & \text{if } \theta'' \in (180°, 270°] \\ -1, & \text{if } \theta'' \in (270°, 360°) \end{cases}.$$

If there was a pre-calculation and only ReconCosine(ID) needs to be determined (when a rotation matrix is encoded by being converted to a quaternion), ReconCosine(ID) is determined by ReconCosine(ID)=signcos $1(\theta''_{Cos})$*ReconSine(ID''$_{Cos}$)
where $$\theta''_{Cos} = \begin{cases} \theta'_{Cos}, & \text{if } \theta'_{Cos} < 180° \\ 180°, & \text{if } \theta'_{Cos} \geq 180° \end{cases}$$

and $\theta''_{Cos} \in [0,180°]$, where $\theta'_{Cos}=ID*QP_\theta$;

$$ID'''_{Cos} = \frac{\theta'''_{Cos}}{QP_\theta}, \theta'''_{Cos} = \begin{cases} \theta''_{Cos}, & \text{if } \theta''_{Cos} \in [0°, 90°] \\ \theta''_{Cos} - 90°, & \text{if } \theta''_{Cos} \in (90°, 180°] \end{cases} \text{ and}$$

$$\text{signcos}1(\theta''_{Cos}) = \begin{cases} +1, & \text{if } \theta''_{Cos} \in [0°, 90°] \\ -1, & \text{if } \theta''_{Cos} \in (90°, 180°] \end{cases}$$

Note that if there was a pre-calculation, i.e. ReconSine (ID for any integer ID'∈[0 . . . 90°/QP$_\theta$] is pre-computed, the same method is used for determining ReconsCosine(ID) and/or ReconsSine(ID) for both LUTS built by uniform sampling or non-uniform sampling methods.

determining said rotation matrix from said at least one reconstructed trigonometric function value.

Therefore, (sin γ, cos γ) is determined from ID$_\gamma$ and the rotation matrix is determined from (sin γ, cos γ).

In the embodiment where the rotation matrix is converted to 3 Euler angles, $(\sin \theta_X, \cos \theta_X)$, $(\sin \theta_Y, \cos \theta_Y)$ and $(\sin \theta_Z, \cos \theta_Z)$ are determined from $ID_X$, $ID_Y$ and $ID_Z$, and the rotation matrix is determined from $(\sin \theta_X, \cos \theta_X)$, $(\sin \theta_Y, \cos \theta_Y)$ and $(\sin \theta_Z, \cos \theta_Z)$.

In the embodiment where the rotation matrix is converted to a quaternion, $(\cos \alpha/2, \sin \alpha/2)$, $\cos \beta_x$, $\cos \beta_y$ and $\cos \beta_z$ are determined from $ID_{\alpha/2}$, $ID_{\beta_X}$, $ID_{\beta_Y}$ and $ID_{\beta_Z}$, and the rotation matrix is determined from $(\cos \alpha/2, \sin \alpha/2)$, $\cos \beta_x$, $\cos \beta_y$ and $\cos \beta_z$.

At step 39, the decoded matched reference 3D-block is determined by the decoded vector pointing to the matched reference 3D-block and the reconstructed reference frame. Suppose the decoded vector pointing to the matched reference 3D-block is $(\Delta x_{Dec}, \Delta y_{Dec}, \Delta z_{Dec})$, Then the left bottom and right top corners of the matched reference 3D-block are $(x_{min}+\Delta x_{Dec}, y_{min}+\Delta y_{Dec}, z_{min}+\Delta z_{Dec})$ and $(x_{min}+\Delta x_{Dec}+16, y_{min}+\Delta y_{Dec}+16, z_{min}+\Delta z_{Dec}+16)$, when the size of the current 3D-block is 16×16×16. Then all the reconstructed points in the decoded reference frame falling into the matched reference 3D-block are selected.

Then, at step 40, firstly, the estimated translation vector T* is determined by the reconstructed rotation matrix at step 38, the center POS of the current 3D-block and the mean position of all the reconstructed points selected at step 39. Secondly, the translation vector is reconstructed by adding the decoded translation estimation error determined at step 34 to the estimated translation vector T*.

At step 42, the transformation matrix is reconstructed from the reconstructed rotation matrix and the reconstructed translation vector, according to FIG. 1.

Then, at step 44, the predictor of the current 3D-block is reconstructed from the reconstructed transformation matrix and the decoded points in the matched 3D-block.

At step 46, the prediction residual is reconstructed.

The resulting prediction residual is used to reconstruct at step 48 the points falling into the current 3D-block from the reconstructed predictor of the current 3D-block.

Figure 9:
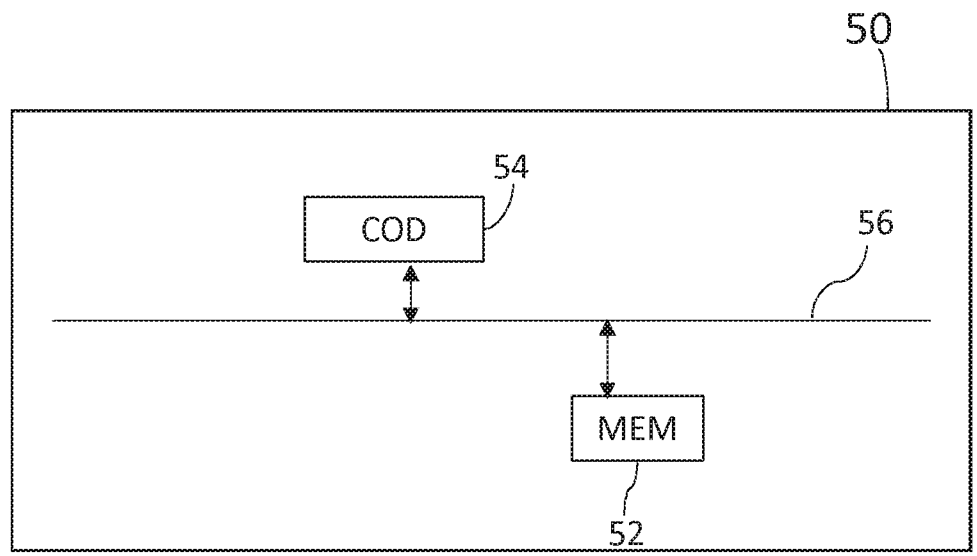
FIG. 9 is a schematic view illustrating an encoder, according to an embodiment of the invention.

FIG. 9 is a block diagram of an exemplary embodiment of an encoder 50 implementing the encoding method of the present disclosure.

Advantageously, the encoder 50 includes one or more processors and a memory 52.

The encoder 50 comprises a coding module 54 for encoding 3D motion information including a geometric transformation comprising rotation information representative of a rotation transformation and translation information representative of a translation transformation, wherein the translation information is represented by a vector $\Delta T$ representing an estimation error of the translation transformation.

According to the represented embodiment, a bus 56 provides a communication path between various elements of the encoder 50. Other point-to-point interconnection options (e.g. non-bus architecture) are also feasible.

Figure 10:
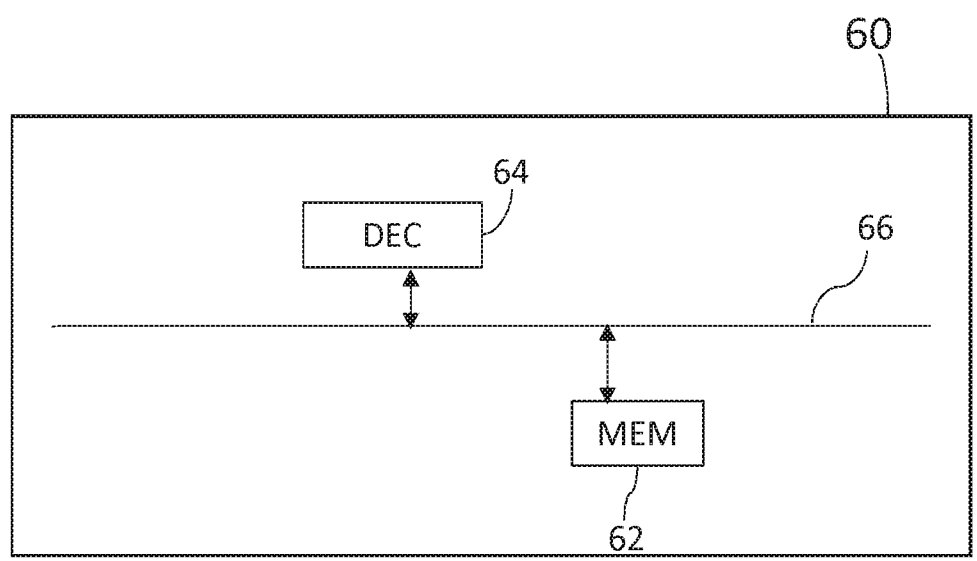
FIG. 10 is a schematic view illustrating a decoder, according to an embodiment of the invention.

FIG. 10 is a block diagram of an exemplary embodiment of a decoder 60 implementing the decoding method of the present disclosure.

Advantageously, the decoder 60 includes one or more processors and a memory 62.

The decoder 60 comprises a decoding module 64 for decoding 3D motion information including a geometric transformation comprising rotation information representative of a rotation transformation and translation information representative of a translation transformation, wherein the translation information is represented by a vector $\Delta T$ representing an estimation error of the translation transformation.

According to the represented embodiment, a bus 66 provides a communication path between various elements of the decoder 60. Other point-to-point interconnection options (e.g. non-bus architecture) are also feasible.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention is not limited to the particular embodiments disclosed, but that the invention includes all embodiments falling within the scope of the appended claims.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

A person skilled in the art will readily appreciate that various parameters disclosed in the description may be modified and that various embodiments disclosed and/or claimed may be combined without departing from the scope of the invention.

For instance, it is interesting to note that the coding method described above as inter-predictive encoding can also be used for intra-prediction based compression of point clouds. That is to say, the reference point cloud frame can be the current point cloud frame to be encoded. And only those already encoded and decoded 3D-blocks can be used as candidate 3D-blocks for encoding the current 3D-block.

The invention claimed is:

1. A predictive video encoding method comprising:
   obtaining 3D motion information comprising a geometric transformation, wherein the 3D motion information comprises a vector pointing to a matched 3D block, wherein the geometric transformation comprises a rotation transformation and a translation transformation, and wherein the rotation transformation is represented by a rotation matrix R;
   obtaining information representative of the rotation transformation;
   obtaining an estimation of the translation transformation based on the information representative of the rotation transformation, wherein the estimation of the translation transformation is obtained as a vector T* from a reconstructed rotation matrix $R^{rec}$;
   determining an estimation error $\Delta T$ between the translation transformation and the estimation; and
   encoding the estimation error $\Delta T$.

2. The method of claim 1, the method further comprising:
   encoding the rotation matrix R; and
   decoding the encoded rotation matrix to obtain the reconstructed rotation matrix $R^{rec}$.

3. The method of claim 1, wherein the matched 3D block is a matched reference 3D block that is associated with a 3D block of a current point cloud frame, and wherein the matched reference 3D block is in a reference point cloud frame.

4. The method of claim 1, wherein the vector T* is a function of the reconstructed rotation matrix $R^{rec}$ and a reconstructed vector pointing to the matched 3D block.

5. The method of claim 1, wherein the geometric transformation is represented by a 4×4 transformation matrix determined using an Iterative Closest Point, ICP, algorithm.

6. A predictive video coding device comprising a processor configured to at least:
- obtain 3D motion information comprising a geometric transformation, wherein the 3D motion information comprises a vector pointing to a matched 3D block, wherein the geometric transformation comprises a rotation transformation and a translation transformation, and wherein the rotation transformation is represented by a rotation matrix R;
- obtain information representative of the rotation transformation;
- obtain an estimation of the translation transformation based on the information representative of the rotation transformation, wherein the estimation of the translation transformation is obtained as a vector T* from a reconstructed rotation matrix $R^{rec}$;
- determine an estimation error ΔT between the translation transformation and the estimation; and
- encode the estimation error ΔT.

7. The predictive video coding device of claim 6, the processor further configured to:
- encode the rotation matrix R; and
- decode the encoded rotation matrix to obtain the reconstructed rotation matrix $R^{rec}$.

8. The predictive video coding device of claim 7, wherein the matched 3D block is a matched reference 3D block that is associated with a 3D block of a current point cloud frame, and wherein the matched reference 3D block is in a reference point cloud frame.

9. The predictive video coding device of claim 6, wherein the vector T* is a function of the reconstructed rotation matrix $R^{rec}$ and a reconstructed vector pointing to the matched 3D block.

10. The predictive video coding device of claim 9, wherein the geometric transformation is represented by a 4×4 transformation matrix determined using an Iterative Closest Point, ICP, algorithm.

11. A predictive video decoding method, comprising:
- obtaining rotation information for predicting a current target block of a point cloud;
- determining an estimate of a translation transformation, wherein the estimate of the translation transformation is determined using at least the rotation information and mean position of reconstructed points associated with a reference block corresponding to the current target block;
- obtaining an estimation error ΔT;
- determining translation information for predicting the current target block from the estimate of the translation transformation and the estimation error ΔT; and
- predicting the current target block of the point cloud, wherein the current target block is predicted using the rotation information and the translation information.

12. The method according to claim 11, wherein the rotation information is decoded from a bitstream, wherein the bitstream comprises a compressed representation of the point cloud.

13. The method of claim 12, wherein the estimation error ΔT is decoded from a bitstream, wherein the bitstream comprises a compressed representation of the point cloud.

14. A predictive video decoding device, the predictive video decoding device comprising a processor configured to:
- obtain rotation information for predicting a current target block of a point cloud;
- determine an estimate of a translation transformation using at least the rotation information and mean position of reconstructed points associated with a reference block corresponding to the current target block;
- obtain an estimation error ΔT;
- determine translation information for predicting the current target block from the estimate of the translation transformation and the estimation error ΔT; and
- predict the current target block of the point cloud using the rotation information and the translation information.

15. The predictive-video decoding device according to claim 14, wherein the rotation information is decoded from a bitstream, wherein the bitstream comprises a compressed representation of the point cloud.

16. The predictive video decoding device of claim 15, wherein the estimation error ΔT is decoded from a bitstream, wherein the bitstream comprises a compressed representation of the point cloud.

17. The predictive video decoding device of claim 15, wherein the rotation information is represented by three Euler angles.

18. The predictive video decoding device of claim 15, wherein the rotation information is represented by a unit quaternion.

* * * * *